US012331774B2

(12) United States Patent
Heinrichs et al.

(10) Patent No.: US 12,331,774 B2
(45) Date of Patent: Jun. 17, 2025

(54) COUPLING BOLT OF A PLUG-IN COUPLING, FIRST COMPONENT WITH THE COUPLING BOLT, ASSOCIATED PLUG-IN COUPLING AND CONNECTING STRUCTURE OF TWO COMPONENTS

(71) Applicant: BÖLLHOFF VERBINDUNGSTECHNIK GmbH, Bielefeld (DE)

(72) Inventors: Heinrich Heinrichs, Vlotho (DE); Waldemar Wedel, Bielefeld (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 202 days.

(21) Appl. No.: 18/177,288

(22) Filed: Mar. 2, 2023

(65) Prior Publication Data

US 2023/0279884 A1    Sep. 7, 2023

(30) Foreign Application Priority Data

Mar. 3, 2022  (DE) .......................... 202022101193.1

(51) Int. Cl.
*F16B 21/16* (2006.01)
*F16B 5/06* (2006.01)
(Continued)

(52) U.S. Cl.
CPC ............ *F16B 5/0664* (2013.01); *F16B 21/06* (2013.01); *F16B 21/075* (2013.01); *F16B 21/16* (2013.01)

(58) Field of Classification Search
CPC .... F16B 21/075; F16B 21/16; F16B 19/1081; F16B 5/0628; F16B 5/065; F16B 5/0664; Y10T 292/0817
See application file for complete search history.

(56) References Cited

U.S. PATENT DOCUMENTS 2,943,373 A * 7/1960 Rapata ................. F16B 21/075
                                              411/908
3,213,506 A * 10/1965 Fernberg ............. F16B 19/1081
                                              24/289
(Continued)

FOREIGN PATENT DOCUMENTS

CN      101171431 A      4/2008
CN      110131272 A      8/2019
(Continued)

OTHER PUBLICATIONS

CN Office Action for CN Application No. 202210481512.9 dated Apr. 12, 2025 (7 pages).

*Primary Examiner* — Flemming Saether
(74) *Attorney, Agent, or Firm* — Reising Ethington P.C.

(57) ABSTRACT

A coupling bolt includes a connecting portion with which the coupling bolt is fastenable to or in a first component, and a shaft extending from the connecting portion and defining a longitudinal axis of the coupling bolt. The shaft has a pre-fixation portion and a fastening portion, and along the longitudinal axis in the direction of the connecting portion the pre-fixation portion comprises a first head portion with a first diameter, a subsequent first, tapering transition portion and a first locking portion with a second diameter which is smaller than the first diameter. Along the longitudinal axis in the direction of the connecting portion, the fastening portion includes a second transition portion adjacent to the first locking portion, a subsequent second head portion with a third diameter that is larger than the first diameter, a third tapering transition portion and a second locking portion.

13 Claims, 9 Drawing Sheets

(51) Int. Cl.
*F16B 21/06* (2006.01)
*F16B 21/07* (2006.01)

(56) References Cited

U.S. PATENT DOCUMENTS

| | | | | |
|---|---|---|---|---|
| 4,403,377 | A | * | 9/1983 | Mizusawa ........... F16B 19/1081 411/908 |
| 5,193,961 | A | * | 3/1993 | Hoyle .................. F16B 21/075 24/297 |
| 5,387,065 | A | * | 2/1995 | Sullivan ............. F16B 19/1081 411/48 |
| 5,507,610 | A | * | 4/1996 | Benedetti ............. F16B 5/0628 411/908 |
| 5,846,040 | A | * | 12/1998 | Ueno ................... F16B 19/008 411/45 |
| 6,149,183 | A | * | 11/2000 | Ford .................. F16B 19/1081 411/510 |
| 6,457,575 | B2 | * | 10/2002 | Swinderman .......... B65G 45/12 198/497 |
| 6,514,024 | B2 | * | 2/2003 | Akema ............... F16B 19/1081 411/908 |
| 7,188,393 | B2 | * | 3/2007 | Kawai ................... F16B 21/082 24/453 |
| 7,690,876 | B2 | * | 4/2010 | Kawai ................. F16B 19/1081 411/45 |
| 7,862,274 | B2 | | 1/2011 | Limpert et al. |
| 10,027,214 | B2 | | 7/2018 | Gröning |
| 11,149,785 | B2 | | 10/2021 | Fladhammer et al. |
| 11,608,849 | B2 | * | 3/2023 | Liebelt ................. F16B 21/075 |
| 12,025,164 | B2 | | 7/2024 | Heinrichs et al. |
| 2021/0355979 | A1 | | 11/2021 | Heinrichs et al. |
| 2023/0279884 | A1 | | 9/2023 | Heinrichs et al. |

FOREIGN PATENT DOCUMENTS

| | | |
|---|---|---|
| CN | 213039666 U | 4/2021 |
| CN | 218347731 U | 1/2023 |
| DE | 102014100197 A1 | 7/2015 |
| DE | 102018124406 A1 | 4/2020 |
| EP | 1469207 A1 | 10/2004 |
| FR | 2901584 A1 | 11/2007 |
| WO | WO2006131823 A1 | 12/2006 |

* cited by examiner

COUPLING BOLT OF A PLUG-IN COUPLING, FIRST COMPONENT WITH THE COUPLING BOLT, ASSOCIATED PLUG-IN COUPLING AND CONNECTING STRUCTURE OF TWO COMPONENTS

CROSS REFERENCE TO RELATED APPLICATIONS

This application claims the priority to German Patent Application No. DE202022101193.1 filed on Mar. 3, 2022, and the content of this priority application is incorporated herein by reference in its entirety.

TECHNICAL FIELD

The present disclosure is related to a coupling bolt of a plug-in coupling, a first component in or to which the coupling bolt is fastened, a plug-in coupling as well as a connecting structure comprising two components and the plug-in coupling.

BACKGROUND

In different application fields of industry, as for example in the automotive construction, releasable plug connections support the universal connecting of at least two components. For example, lamps are installed in vehicle bodies or add-on parts are arranged for designing a vehicle interior.

An example of such a plug-in coupling having a bushing or receiving and a bolt or pin is described in DE 10 2014 100 197 U1. The bushing includes opposing first and second main faces and a hole ending in at least one of the first and second main faces, with the hole defining at least the following in the plug-in direction of the pin subsequently to one another: an entry zone, a first narrowed zone having a first width, an inner cavity having a maximum width that is larger than the first width of the first narrowed zone, a second narrowed zone having a second width that is smaller than the maximum width of the inner cavity, with the second narrowed zone being arranged at a distance to the first narrowed zone, an end zone having a width that is larger than the second width of the second narrowed zone. Subsequently to one another in the direction of the inserting of the pin into the bushing, the pin includes at least the following: a first bead having a first maximum cross section separating a front part of the first bead from a back part of the first bead, a first narrower portion having a minimum cross section which is smaller than the maximum cross section of the first bead, a second bead having a second maximum cross section separating a front part of the second bead from a back part of the second bead, a second narrower portion having a minimum cross section that is smaller than the maximum cross section of the second bead, with the second narrower portion being located at a distance to the first narrower portion. In any case, the maximum cross section of the first bead is smaller than the maximum cross section of the second bead. In addition, the first narrower portion has a width which is larger or equal to the widths of the first and the second narrowed zones. The second narrower portion has a width which is larger than or the same as the widths of the first and second narrowed zones. The second narrower portion has a width that is larger than or the same as the width of the first narrowed zone. At least one portion of the back part of the first bead of the pin has a shape matching the end zone of the bushing, and at least one section of the back part of the second bead of the pin has a shape matching the back part of the inner cavity of the bushing.

EP 1 469 207 A1 also describes a coupling device. It includes a bolt consisting of a rod which is fastened with a head. The rod transfers a pressure between a basis and the head of the bolt. A fastening adapter has a wall defining a cavity which is divided into an upper and a lower housing. An inner wall of the housing has a flange which is designated to interact with a flange which is formed due to the pressure in the rod.

A support element holding sleeve is furthermore described in FR 2 901 584 A1. It has a cylindrical hollow body with an outer lateral wall that is provided with a mounting unit of a support element extending transversely to the exterior of the body. The body contains a spherical housing, the dimensions of which are the same as those of a spherical part with large diameter of a carrier axle. At one end, the housing has a bolt hole and is elongated at an opposite end by a wide opening and a widened conical recess, so that a spherical part with small diameter freely crosses the hole.

Finally, WO 2006/131823 A1 describes a fastening element for fastening a component in a carrier that is provided with an aperture. The fastening element includes a fastening casing out of elastic plastic material, a hollow shell and a plastic plug which is equipped with a head and which can be inserted from the flanged end of the fastening casing into a plug cavity, and which widens the housing radially and prevents pulling it out of the aperture. At the wall of the casing cavity, at least one radially inwardly facing projection is provided. At its end, the plug is fitted with a preferably circumferential groove into which the projection enters when the plug is pressed into the shell of the fastening casing. The plug is affixed to the side of a clearance which faces the head of the plug, wherein a shoulder engages under the projection when the plug is fully inserted into the shell.

The double locking which is used in the state of the art serves for increasing a demounting force by means of an additional locking behind an undercut. With the known plug-in couplings with double locking, neither a length tolerance, i.e., a tolerance along an axis in the plane perpendicular to the plug-in direction, can be compensated nor is a pre-fixation of the components which are to be fastened to each other implementable. However, such a fixation would may be desirable in case of components having a plurality of plug-in couplings in order to guarantee the correct alignment of the components to be connected to one another with respect to each other and avoid possible tensions in the components. This may apply to components having a larger extension in one, for example the longitudinal direction, than in the other direction, namely the transverse direction.

It is therefore the object of at least some implementations of the present disclosure to provide a plug-in coupling that is optimized in terms of the problems arising from the state of the art, an associated coupling bolt, a corresponding first component as well as an associated connecting structure.

SUMMARY

The above object is solved by a coupling bolt of a plug-in coupling, a first component with the coupling bolt, a plug-in coupling as well as a connecting structure. Advantageous embodiments and further developments arise from the following description, the drawings as well as the appending claims.

A coupling bolt of a plug-in coupling includes a connecting portion with which the coupling bolt is fastenable to or in a first component, a shaft extending from the connecting portion with the shaft defining a longitudinal axis of the coupling bolt, wherein along the longitudinal axis in the direction of the connecting portion the shaft comprises a pre-fixation portion and a fastening portion and along the longitudinal axis in the direction of the connecting portion the pre-fixation portion comprises a first cylindrical head portion with a first diameter, a subsequent first, conically tapering transition portion and a first locking portion with a second diameter which is smaller than the first diameter, wherein along the longitudinal axis in the direction of the connecting portion, the fastening portion comprises a second conically widening transition portion adjacent to the first locking portion, a subsequent second cylindrical head portion with a third diameter that is larger than the first diameter, a third conically tapering transition portion and a second locking portion.

The term cylindrical, as used herein, includes the requirement that an extension of the respective portion with constant diameter is present along the longitudinal axis. Compared to that, the term conical refers to a portion in which the diameter changes continuously.

For the better understanding of the features of the coupling bolt and the associated functionality, the coupling bolt during use is described in the following. Therefore, the starting point is a first component in which or to which the coupling bolt is fastened via the connecting portion. In this context, the coupling bolt may be made of a plastic material. Alternatively, the coupling bolt may be made of a metallic material. A coupling seat is fastened in or to a second component.

To connect the first component with the second component, the coupling bolt is inserted into a receiving space of the coupling seat with the pre-fixation portion first. This movement defines the plug-in direction which may extend on or parallel to the longitudinal axis of the coupling bolt.

Here, the first cylindrical head portion encounters an inner locking structure of the coupling seat. This is detectable by the fact that firstly, the necessary inserting force increases to a first value. In the portion of the first cylindrical head portion, the inserting force decreases as the inner locking structure does not have to be opened further due to the cylindrical shape.

As soon as the cylindrical head portion has passed the inner locking structure, the inner locking structure moves along the first conically tapering transition portion up to the first locking portion. During this movement, the necessary force continues to decrease, which may be continuously and not discontinuously or discretely. At the end of this process, the coupling bolt and thus the first component are in a pre-fixation position.

Particularly due to the combination of the first cylindrical head portion with the first conically tapering transition portion, the force necessary for inserting the coupling bolt does not decrease discontinuously. Rather, a steady decrease of the inserting force may be provided. In the course of the manual establishing of the connection, this is what particularly causes the worker to not experience a sudden decrease of the necessary inserting force after overcoming the inner locking structure, as is the case with a spherical bolt head. The same applies analogously for the inserting by means of a corresponding automatic machine, robot, or the like.

The pre-fixation position may be advantageous in case of first components having a plurality of coupling bolts along an axis and having to be fixed to a second component. This pre-fixation position may enable a reliable retention of the first component at a defined distance to the second component on the one hand and on the other hand, it provides the possibility that the first component be aligned correctly with respect to the second component, e.g., to consider the presence of a sealing and its positioning.

Once the first and the second component have been aligned correctly with respect to each other, the coupling bolt is further moved in the plug-in direction into the coupling seat. The plug-in direction may extend on or parallel to the longitudinal axis of the coupling bolt, as shown above. Accordingly, the inner locking structure of the coupling seat now moves along the second conically widening transition portion which is already part of the fastening portion. Due to the conical design, the inserting force may change steadily and not discontinuously or discretely.

Once the second conically widening transition portion has passed the inner locking structure, the inner locking structure moves along the second cylindrical head portion. Analogously to the pre-fixation portion, a further moving of the coupling bolt in the plug-in direction now causes the inner locking structure to move along the third conically tapering transition portion up to the second locking portion. The coupling bolt and thus the first component are now located in a fastening position. The fastening position provides a higher pull-out force compared to the pre-fixation position, because the third diameter of the second cylindrical head portion may be larger than the first diameter of the first cylindrical head portion.

As already shown above, the special advantage of the coupling bolt is the combination of the cylindrical head portion with the one or more adjoining conical transition portion(s). This is what may facilitate the inserting of the coupling bolt into the coupling seat and enables, due to the course of the inserting force, an optimized handling when establishing the connection. This is independent of whether the inserting takes place manually or in an automated way. Furthermore, the cylindrical design of the respective head portion may ensure that no punctual or linear forces act upon the coupling bolt in the pre-fixation position and/or the fastening position. Rather, there is an areal abutment at the coupling seat, which has an advantageous effect on the durability of the connection established by the plug-in coupling.

For the sake of completeness, it is pointed out that the above steps take place vice versa in case of a disassembly. Accordingly, the above statements regarding the insertion force also apply analogously with regard to a pull-out force when releasing the connection.

In a further embodiment of the coupling bolt, the second locking portion has a fourth diameter corresponding to the second diameter. In addition, the first and/or the second locking portion may be configured cylindrically. Due to these configurations, the coupling bolt is adaptable to the respective application, which may be with respect to the necessary inserting and pull-out force as well as the length.

In a further embodiment of the coupling bolt, the pre-fixation portion of the same has an inserting portion adjacent to the first cylindrical head portion and facing away from the connecting portion. With the inserting portion, the force necessary for the initial inserting can be adapted to the respective application.

Advantageously, the inserting portion has the shape of a spherical section or a spherical disc. A spherical section or also a spherical segment results when a part of a ball or of a spherical body is separated by the cut with one plane. In contrast to that, a spherical disc or a spherical layer results when part of a ball or of a spherical body is cut out from two parallel planes. In other words, the spherical section provides an inserting portion that is configured completely round whereas the spherical disc provides an inserting portion that is flat in the portion of the longitudinal axis. Both configurations have proven advantageous with regard to the inserting behavior of the coupling bolt into the coupling seat.

A fourth conically widening transition portion and/or a conically widening shaft portion may adjoin the second locking portion of the fastening portion. With the further shaft portion, the length of the coupling bolt may be adapted to the desired application and/or an additional radial support in the coupling seat may be realized. In contrast to that, the further transition portion provides a limitation of the movement in the inserting direction.

In a further embodiment of the coupling bolt, a step is provided between the shaft and connecting portion and/or the connecting portion is configured with two steps. The stepped configuration of the connecting portion may facilitate a fastening of the coupling bolt in the first component, which may be when the first component is produced by means of injection molding and the connecting portion of the coupling bolt is molded-in or overmolded.

A first component includes a coupling bolt wherein the coupling bolt is fastened in or at the first component. Thus, the first component includes the coupling bolt. With regard to the resulting technical effects and advantages, reference is therefore made to the above explanations in order to avoid repetitions.

The connecting portion of the coupling bolt may be at least partly molded into the first component or embedded therein. The molding or embedding of the coupling bolt via the connecting portion into the first component may guarantee a reliable fastening of the coupling bolt in or at the first component. Furthermore, this kind of fastening can take place during the production of the first component, when the first component consists of a plastic material. Thus, the production method for the first component with the coupling bolt molded into it is not more complex than when compared with the production of the first component without coupling bolt. Rather, the additional step of the fastening of the coupling bolt at or in the first component can be avoided with this approach.

A plug-in coupling includes a coupling bolt as well as a coupling seat which may be configured in the form of an elongated hole. The use of a coupling seat configured as an elongated hole in combination with the coupling bolt which may allow a compensation of tolerances between the two components, which are to be fastened to one another, along an axis. Beside the above-discussed advantages of the coupling bolt, the further advantage arises that length tolerances, namely tolerances can be compensated along an axis in a plane perpendicular to the inserting direction of the coupling bolt into the coupling seat.

In a further embodiment of the plug-in coupling, the coupling seat is a coupling seat that is configured as one part, which is lockable in an elongated hole-like installation opening of a second component, provides a receiving space in which the coupling bolt is lockable in a pre-fixation position and a fastening position and is linearly movable in the receiving space in a locked state. The coupling seat may comprise the following features: a closed circumferential wall of a dome-like vault encompasses the receiving space of the coupling bolt, wherein the vault includes an outer locking structure for fastening the coupling seat in the installation opening of the second component, an open end with an elongated hole-like inserting opening for an inserting of the coupling bolt in an inserting direction and a closed end with an adjacent inner locking structure for the coupling bolt, an elongated hole-like opening cross-section of the inserting opening as well as an elongated hole-like inner vault cross section of the receiving space, each perpendicular to the plug-in direction are defined by a longitudinal axis and a shorter transverse axis extending transversely to the same, and at an inner wall of the receiving space, the inner locking structure of the dome-like vault includes two inner locking webs being arranged opposite to each other, which extend parallel to the transverse axis of the inner vault cross section and form an undercut contrary to the inserting direction, wherein the inner locking structure does not comprise any locking webs parallel to the transverse axis of the inner vault cross-section and allows a movement of a locked coupling bolt along the inner locking webs in the receiving space transverse to the plug-in direction. With regard to the details of a corresponding coupling seat, additional reference is made to DE 10 2018 124 406 A1. Here, a correspondingly designed coupling seat is described in detail with regard to the construction, the functionality as well as the materials used.

A connecting structure includes a first component, a second component as well as a plug-in coupling, with the coupling bolt being fastened in or at the first component and the coupling seat being fastened in or at the second component and the coupling bolt being locked in the coupling seat. In the connecting structure, the plug-in coupling and thus the coupling bolt is used to establish the connection between the first and the second component. With respect to the details, reference is therefore made to the above explanations in connection with the coupling bolt.

An exemplary connecting method by using the plug-in coupling includes the following steps: providing a first component with an coupling bolt being fastened to it or in it, providing a second component with a coupling seat being arranged to it or in it, arranging the first and the second component relative to one another in a way that the coupling bolt is insertable in the inserting direction into the coupling seat with the pre-fixation portion first, inserting the coupling bolt into the coupling seat into a pre-fixation position and after that, further inserting along the inserting direction into a fastening position. After the step of reaching the pre-fixation position, an alignment of the first component to the second component can optionally take place in order to avoid tensions between the components or in one of the components later in the fastening position.

BRIEF DESCRIPTION OF THE DRAWINGS

In the following, the present disclosure will be described in detail with respect to the drawings. In the drawings, the same reference signs denote the same components and/or elements. It shows.

DETAILED DESCRIPTION

In the following and with reference to the drawings, an embodiment of a coupling bolt 1 is first of all explained based on FIGS. 1-3. The coupling bolt 1 includes a connecting portion 10 and a shaft 20 extending from the connecting portion 10, with the shaft defining a longitudinal axis $L_1$ of the coupling bolt. The coupling bolt 1 may be made of a plastic. Alternatively, the coupling bolt 1 may be made of a metallic material.

The coupling bolt 1 is fastenable at or in a first component A with the connecting portion 10. As can be seen in FIG. 1, a step 12 is present between the shaft 20 and the connecting portion 10. Furthermore, there is a second step 14 within the connecting portion 10. That means, the connecting portion 10 is configured with two steps. The advantages of this construction will become obvious later in the explanation regarding the use of the coupling bolt 1.

Along the longitudinal axis $L_1$ in the direction of the connecting portion 10, the shaft 20 comprises a pre-fixation portion 30 as well as a fastening portion 40. Along the longitudinal axis $L_1$ in the direction of the connecting portion 10, the pre-fixation portion comprises an inserting portion 32. With the inserting portion, the force necessary for the initial inserting can be adapted to the respective application. In the illustrated embodiment, the inserting portion 32 has the shape of a spherical disc. A spherical disc or spherical layer results when a part of a ball or a spherical body is cut out from two parallel planes. Thus, the spherical disc provides an inserting portion which is flattened centrally in the portion of the longitudinal axis.

Alternatively, the inserting portion may have the shape of a spherical section. A spherical section or also a spherical segment results when a part of a ball or a spherical body is separated by the cut with one plane. In other words, the spherical section provides an inserting portion that is formed round in the portion of the longitudinal axis $L_1$ centrally, too.

Adjoining to the inserting portion 32, a first cylindrical head portion 34 with a first diameter $D_1$ is provided. The term cylindrical, as used herein, requires that an extension of the respective portion along the longitudinal axis $L_1$ with constant diameter is present.

Adjacent to the first cylindrical head portion 34 and facing the connecting portion 10, i.e., adjoining the first cylindrical head portion along the longitudinal axis $L_1$ in the direction of the connecting portion 10, a first conically tapering transition portion 36 is provided. The term conical refers to a portion the diameter of which changes continuously. In the present case, the diameter in the conical portion changes from the first diameter $D_1$ to a second diameter $D_2$.

The second diameter $D_2$ is provided in a first locking portion 38. Due to the configuration as the first locking portion 38, the second diameter $D_2$ is smaller than the first diameter $D_1$. The technical effects and functionalities which are present due to the chosen cylindrical and conical shape are explained in detail in the following in the description regarding the establishing of the connection.

Along the longitudinal axis $L_1$ in the direction of the connecting portion 10, the fastening portion 40 first of all has a second conically widening transition portion 42. It adjoins the first locking portion 38 of the pre-fixation portion 30. Adjoining to the second conically widening transition portion 42, a second cylindrical head portion 44 with a third diameter $D_3$ is provided. The third diameter $D_3$ is greater than the first diameter $D_1$. In other words, the second cylindrical head portion 44 has a greater third diameter $D_3$ than the first cylindrical head portion 34 with the first diameter $D_1$. This feature will become apparent later in the description of the establishment of the connection, too.

Adjoining to the second cylindrical head portion 44, a third conically tapering transition portion 46 is provided. A second locking portion 48 adjoins.

In the illustrated embodiment, the second locking portion has a fourth diameter $D_4$ which corresponds to the second diameter $D_2$ of the first locking portion 38. Furthermore, the first 38 and the second locking portion 48 are configured cylindrically. Due to the cylindrical configuration, an adaption of length of the coupling bolt 1 to the desired application can be made within the respective locking portion.

In the illustrated embodiment, a fourth conical transition portion 22 adjoins the second cylindrical locking portion 48. The fourth transition portion 22 is a fourth conically widening transition portion 22. In addition to that or alternatively, a cylindrical or conical shaft portion 24 can adjoin the second cylindrical locking portion 48 or the fourth conically widening transition portion 22. In the illustrated embodiment, the shaft portion 24 is a conical shaft portion 24. These configuration possibilities offer the possibility of adapting the coupling bolt 1 optimally to the respective application case.

With respect to FIGS. 4-7, the coupling seat 3 is now discussed. The coupling seat 3 is a coupling seat 3 configured as one part, which is lockable in an elongated hole-like installation opening of a second component B. The coupling seat 3 provides a receiving space 50. In the receiving space 50, the coupling bolt is releasably lockable in a pre-fixation position and a fastening position. Furthermore, the coupling bolt is movable in a straight-lined manner in a locked state in the receiving space 50. These functionalities become obvious later in the explanation of the establishment of the connection.

The coupling seat 50 includes a closed circumferential wall 52 of a dome-like vault which encompasses the receiving space 50 of the coupling bolt 1. The vault comprises an outer locking structure 54 for fastening the coupling seat 3 in the installation opening of the second component B. An open end is configured with an elongated hole-like plug-in opening 56 for a plugging-in of the coupling bolt 1 in a plug-in direction. Furthermore, a closed end 58 with an adjacent inner locking structure 60 for the coupling bolt 1 is provided.

An elongated hole-like opening cross section of the plug-in opening 56 as well as an elongated hole-like inner vault cross section of the receiving space 50 each perpendicular to the plug-in direction are defined by a longitudinal axis $L_{56}$ and a shorter transverse axis $Q_{56}$ extending transversely to it. The plug-in direction may run along the longitudinal axis $L_1$ of the coupling bolt 1, as explained in the beginning. In other words, the plug-in direction is perpendicular to the plane which is defined by the longitudinal axis $L_{56}$ and the transverse axis $Q_{56}$.

At an inner wall of the receiving space 50, the inner locking structure 60 of the dome-like vault includes two inner locking webs 62 arranged opposite to one another. The inner locking webs 62 run parallel to the longitudinal axis $L_{56}$ of the inner vault cross section and form an undercut contrary to the plug-in direction.

No locking webs are provided parallel to the transverse axis $Q_{56}$ of the inner vault cross section. Furthermore, a movement of a locked coupling bolt 1 along the inner locking webs 62 in the receiving space transverse to the plug-in direction is allowed.

Depending on the application case, a sealing 64 can furthermore be provided at the coupling seat 3.

With respect to the details of a corresponding coupling seat 5 as is shown in FIGS. 4-7, additional reference is made to DE 10 2018 124 406 A1. There, a correspondingly configured coupling seat is described in detail with respect to the configuration, the functionality as well as the materials used.

Figure 1:
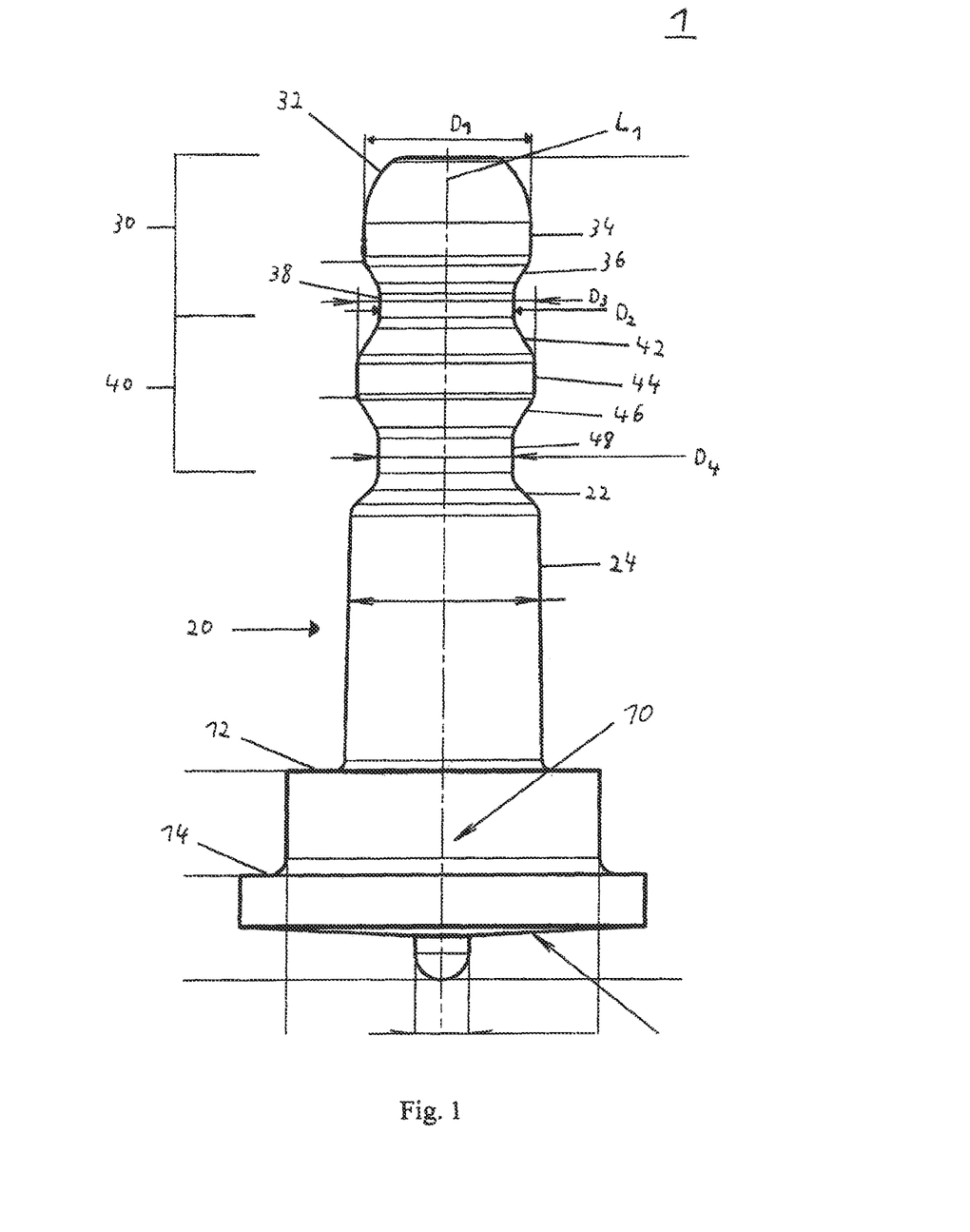
FIG. 1 a lateral view of an embodiment of a coupling bolt of a plug-in coupling, FIG. 2 a perspective view of the coupling bolt of FIG. 1, FIG. 3 a view of the coupling bolt of FIG. 1 along the longitudinal axis in direction of the connecting portion, FIG. 4 a perspective view of an embodiment of a coupling seat, FIG. 5 a lateral view of the coupling seat of FIG. 4, FIG. 6 a top view onto the coupling seat of FIG. 4, FIG. 7 a lateral view of the coupling seat according to FIG. 4 with partial cut, FIG. 8 a first perspective view of the coupling bolt of FIG. 1 in connection with the coupling seat of FIG. 4, FIG. 9 a second perspective view of the coupling bolt of FIG. 1 in combination with the coupling seat of FIG. 4, FIG. 10 a sectional view of the coupling bolt that is inserted into the coupling seat along the transverse axis of the coupling seat in an initial state, FIG. 11 a sectional view of the coupling bolt that is inserted into the coupling seat along the longitudinal axis of the coupling seat in an initial state, FIG. 12 a sectional view of the coupling bolt that is inserted into the coupling seat along the transverse axis of the coupling seat in a pre-fixation position, FIG. 13 a sectional view of the coupling bolt that is inserted into the coupling seat along the longitudinal axis of the coupling seat in a pre-fixation position, FIG. 14 a sectional view of the coupling bolt that is inserted into the coupling seat along the transverse axis of the coupling seat in a fastening position, FIG. 15 a sectional view of the coupling bolt that is inserted into the coupling seat along the longitudinal axis of the coupling seat in a fastening position, and FIG. 16 flow chart of an embodiment of a connecting method.
Figure 2:
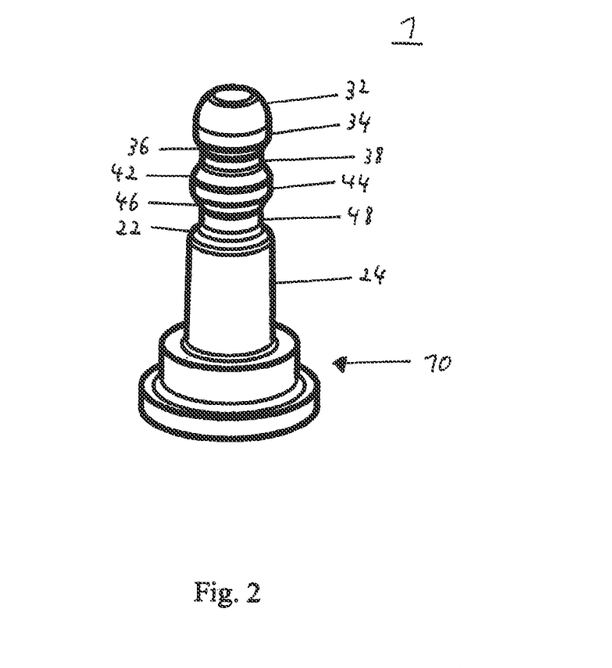
Figure 3:
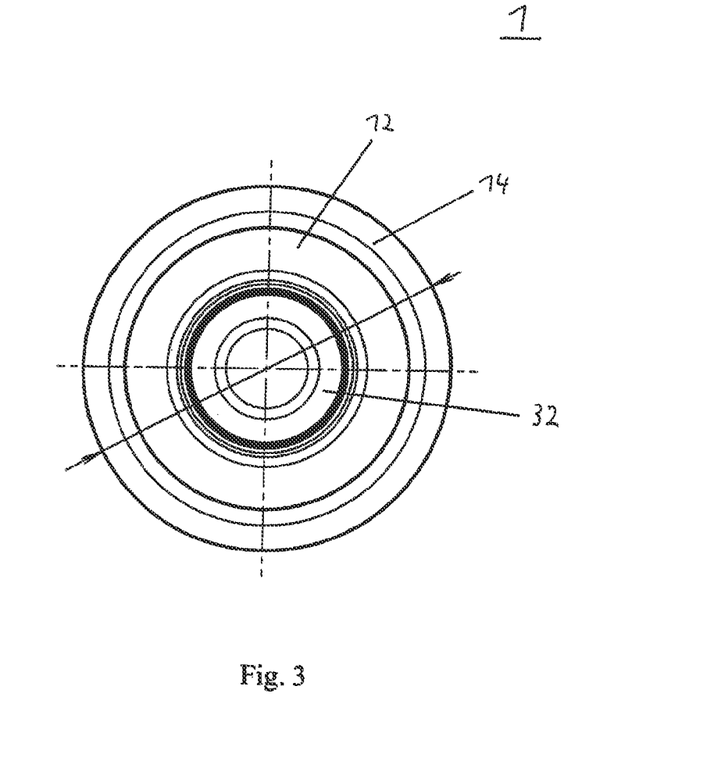
Figure 4:
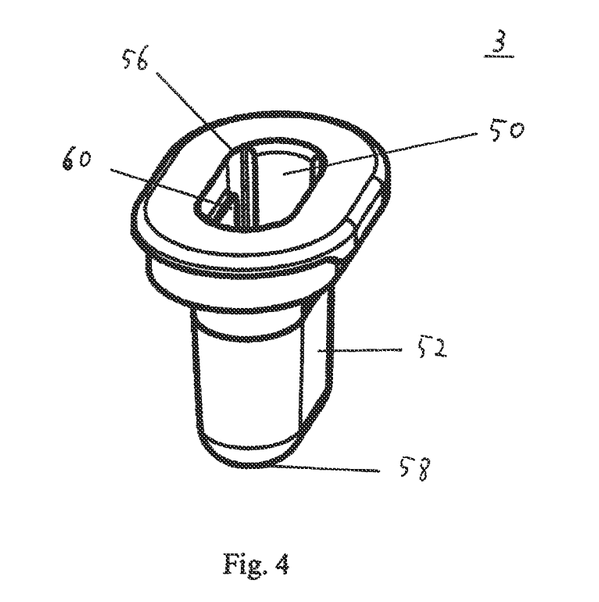
Figure 5:
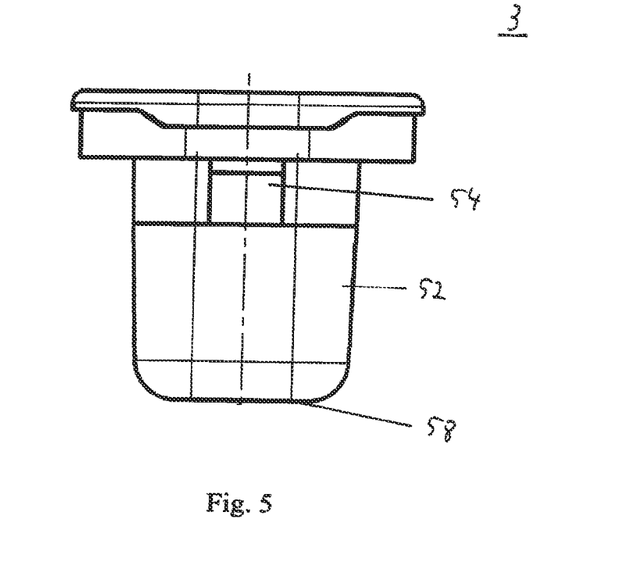
Figure 6:
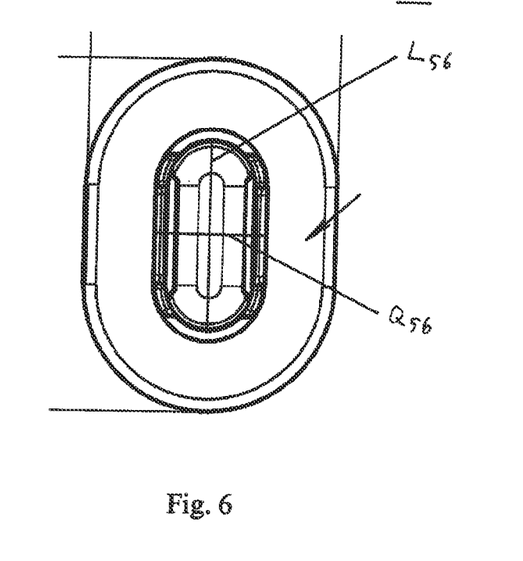
Figure 7:
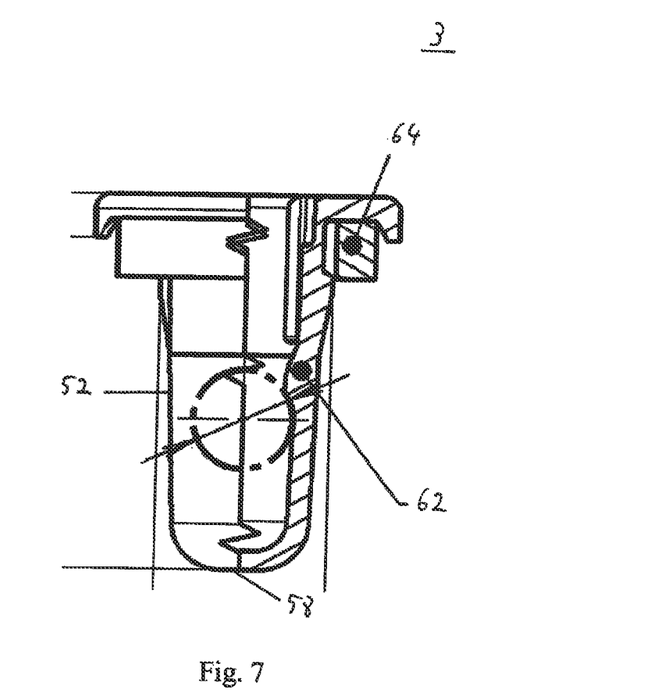
Figure 8:
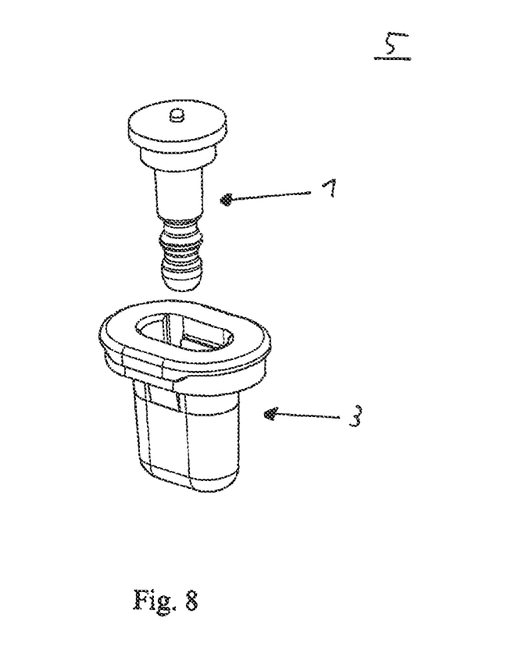
Figure 9:
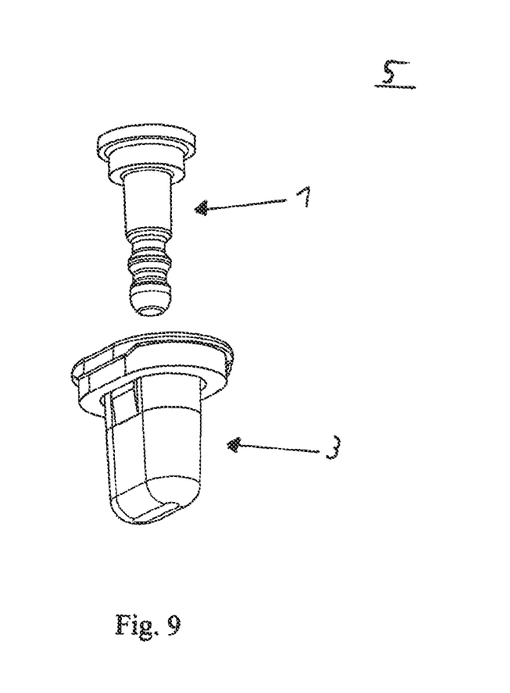
Figure 10:
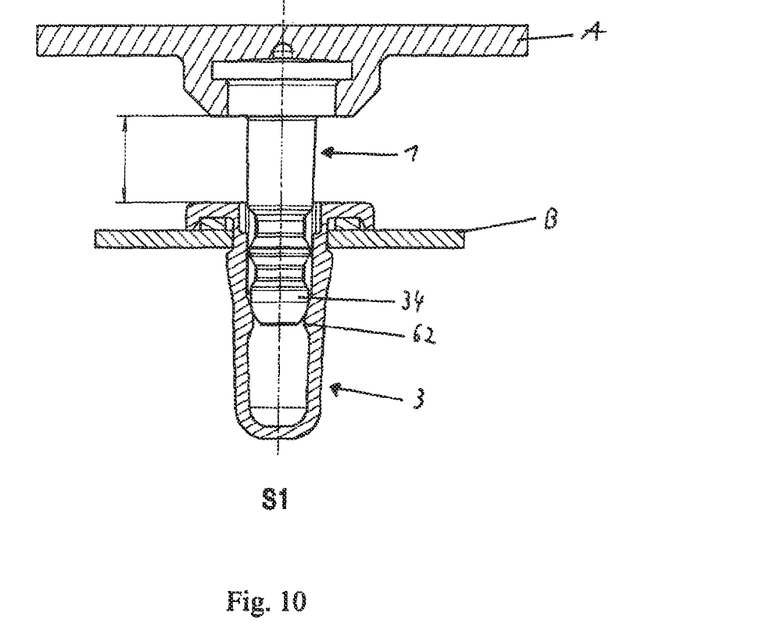
Figure 11:
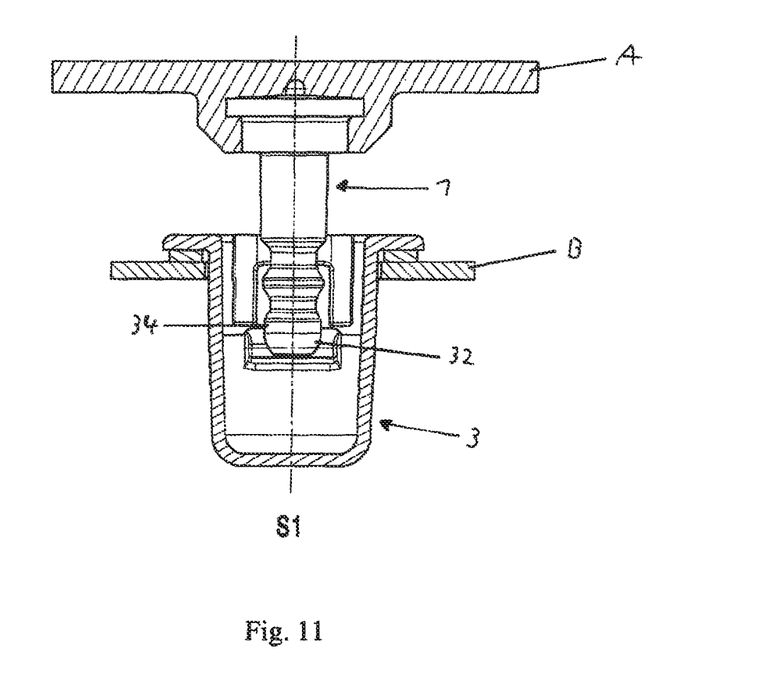

FIGS. 8 and 9 show the coupling bolt 1 according to FIGS. 1 to 3 in alignment with the coupling seat 3 according to FIGS. 4 to 7 and thus an embodiment of a plug-in coupling 5. The components which are to be connected with each other are not yet illustrated in these figures for reasons of clarity.

With respect to FIGS. 10-16, a possible connecting method and the resulting steps are now explained. Firstly, in a first step A, a providing of a first component A with a coupling bolt 1 fastened to it or in it takes place. In case of the embodiment with the two-step configuration of the connecting portion 10, it may be advantageous that the connecting portion 10 of the coupling bolt 1 is at least partly molded or embedded into the first component A. Because due to the molding or embedding of the coupling bolt 1 via the connecting portion 10 into the first component A, a reliable fastening of the coupling bolt 1 in or at the first component A may be guaranteed. Furthermore, this fastening can take place when producing the first component A, particularly when the first component A consists of a plastic material. Thus, the production method for the first component with the coupling bolt 1 formed in it is not more complex than compared with the production of the first component A without coupling bolt. Rather, an additional step for fastening the coupling bolt 1 at or in the first component A can be avoided with this approach.

Figure 16:
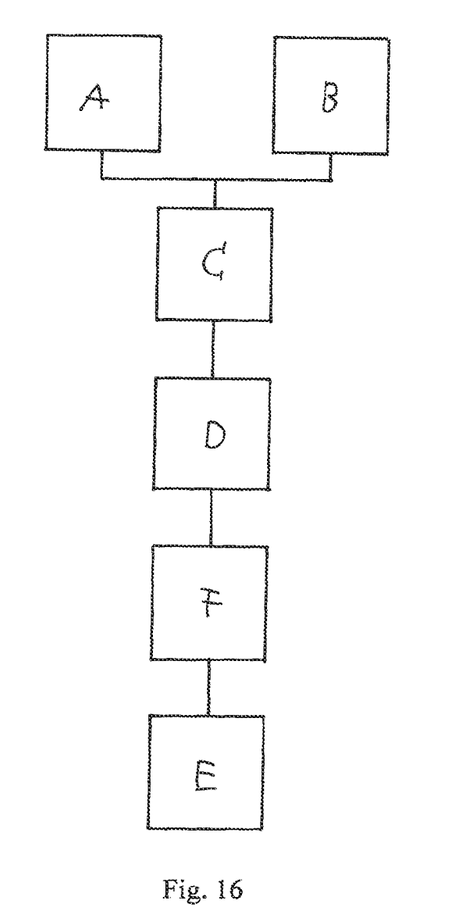

In a second step B which takes place before, at the same time of or after the first step, a providing of a second component B with a coupling seat 3 arranged to it or in it takes place.

Now, in a step C, the first A and the second component B are arranged relative to one another in a way that the coupling bolt 1 is insertable into the coupling seat 3. Additional reference is made to FIGS. 10 and 11 in this context, in which the coupling bolt 1 is inserted into the coupling seat 3 so far that the inserting portion 32 abuts the inner locking webs 62.

Figure 12:
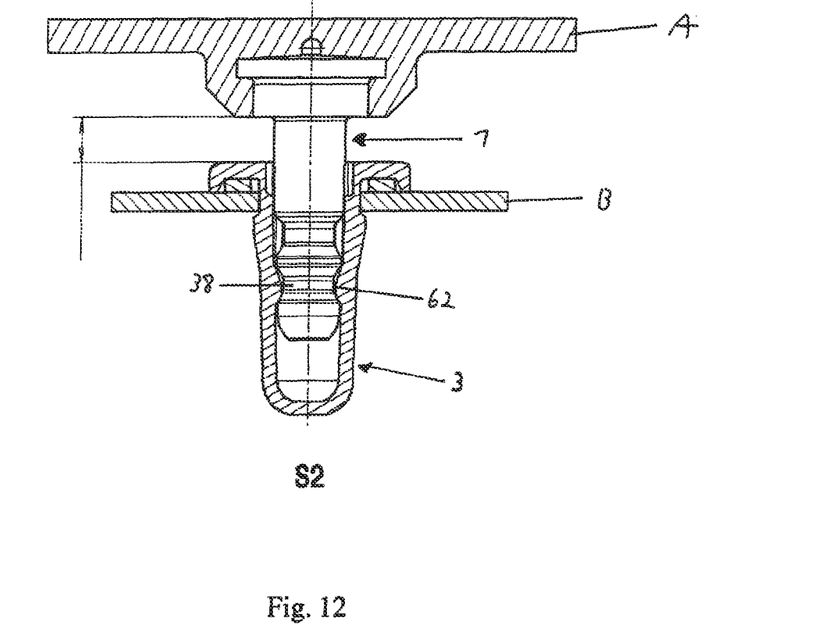
Figure 13:
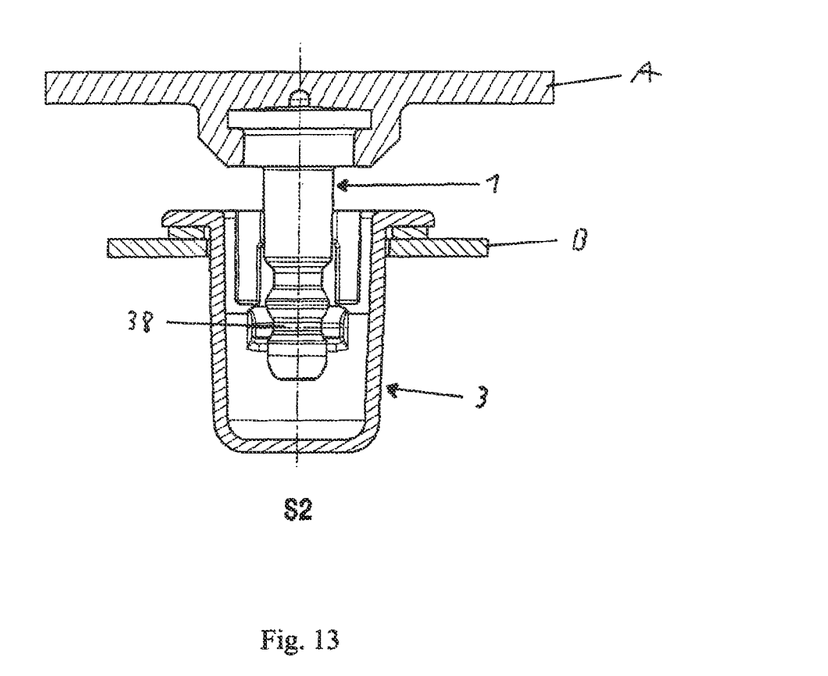

In step D, the inserting of the coupling bolt 1 into the coupling seat 3 in a pre-fixation position now takes place. This is shown in FIGS. 12 and 13. This means that the inner locking webs 62 were moved along the first cylindrical head portion 34, with the inserting portion having to pass the inner locking webs 62, first. This can be detected by the fact that the necessary inserting force increases to a first value. This first value decreases in the portion of the first cylindrical head portion 34 to a constant second value. As soon as the first cylindrical head portion 34 has passed the inner locking structure 60 and thus the inner locking webs 62, the inner locking webs 62 move along the first conically tapering transition portion 36 up to the first locking portion 38. Now, the coupling bolt 1 and thus the first component A are in a pre-fixation position.

Due to the combination of the first cylindrical head portion 34 with the first conically tapering transition portion 36, the force necessary for the inserting of the coupling bolt 1 may not decrease discontinuously. Rather, a constant decrease of the inserting force may be provided. In the course of the manual establishing of the connection, this may lead to the worker not having to experience a spontaneous decrease of the necessary inserting force after overcoming the inner locking structure or the inner locking webs 62, as in case of a spherically formed bolt head. The same applies analogously to the inserting by means of a corresponding automatic machine, robot, or the like.

The pre-fixation position may be advantageous in case of first components which comprise a plurality of coupling bolts 1 and which must be fastened to a second component B. Because this pre-fixation position, may enable that the first component A is reliably held at a defined distance to the second component B on the one hand and on the other hand, it provides the option that the first component A is aligned correctly with respect to the second component B, for example to consider the presence of a sealing 64 and its positioning. Such an alignment takes place in step F. The elongated hole-like design of the coupling seat 3 may support such an alignment.

Figure 14:
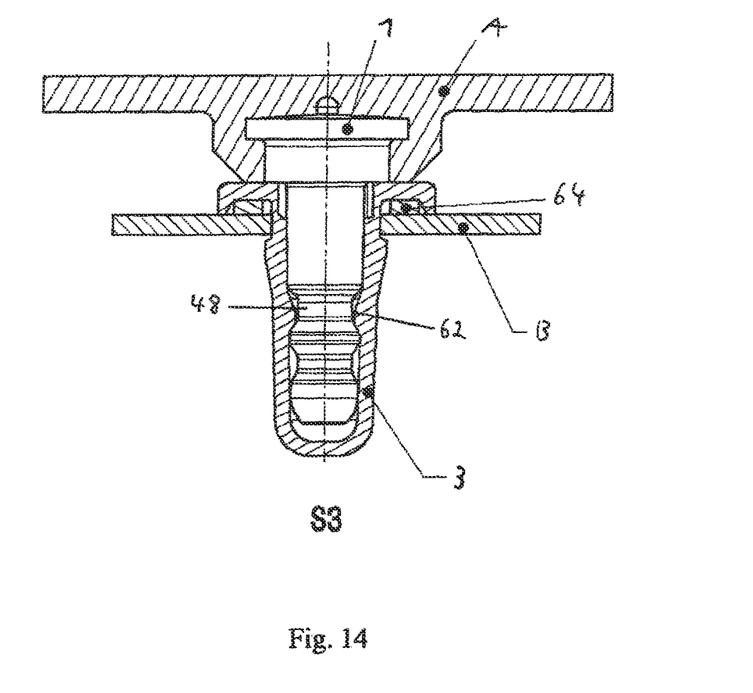
Figure 15:
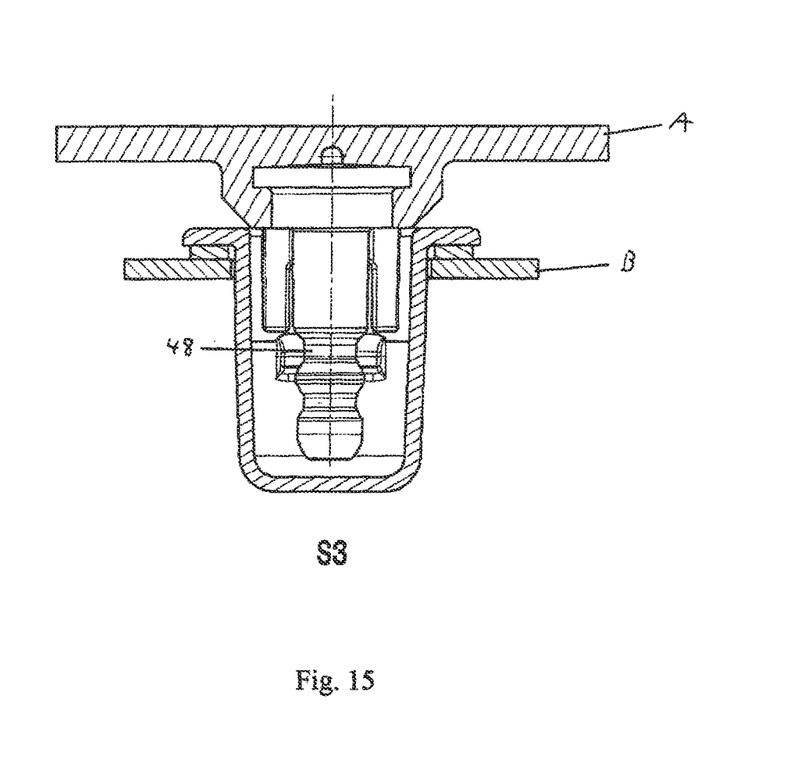

Once the first A and the second component B have been aligned to one another correctly in step F, the coupling bolt 1 is moved further in the plug-in direction into the coupling seat 5 into a fastening position in step E. Accordingly, the inner locking webs 62 of the coupling seat 3 now move along the second conically widening transition portion 42, which is already part of the fastening portion 40. Due to the conical design, the inserting force may not change discontinuously but continuously.

Once the second conically widening transition portion 42 has been passed, the inner locking webs 62 move along the second cylindrical head portion 44. As is the case with the pre-fixation portion, a further moving of the coupling bolt 1 in the inserting direction now causes the inner locking webs 62 to move along the third conically tapering transition portion 46 up to the second locking portion 48. Now, the coupling bolt 1 and thus the first component A is in a fastening position. This is shown in FIGS. 14 and 15. Due to the larger diameter of the second cylindrical head portion 44 in comparison with the first cylindrical head portion 34, the fastening position provides a higher pull-out force compared with the pre-fixation position.

A disassembling of the components takes place in the reverse order. Accordingly, the same explanations regarding the inserting force analogously apply to a pull-out force.

The specific advantage of the coupling bolt 1 is the combination of the respective cylindrical head portion 34, 44 with the adjoining conical transition portion(s) 36, 42, 46. This may be what may facilitate the inserting of the coupling bolt 1 into the coupling seat 3 and enables an optimized handling when establishing the connection due to the course of the inserting force. This is independent of whether the inserting takes place manually or in an automated manner. In addition, the cylindrical design of the respective cylindrical head portion 34, 44 ensures that no punctual or linear forces act upon the coupling bolt 1 in the prefixation position and/or the fastening position. Rather, there is a plane abutment at the coupling seat 3, which has an advantageous effect on the durability of the connection which is established by the plug-in coupling.

The invention claimed is:

1. Coupling bolt of a plug-in coupling, including
   a. a connecting portion with which the coupling bolt is fastenable to or in a first component,
   b. a shaft extending from the connecting portion, with the shaft defining a longitudinal axis of the coupling bolt, wherein
   c. along the longitudinal axis in the direction of the connecting portion, the shaft comprises a pre-fixation portion and a fastening portion and
   d. along the longitudinal axis in the direction of the connecting portion, the pre-fixation portion comprises a first cylindrical head portion with a first diameter, an adjoining first, conically tapering transition portion and a first locking portion with a second diameter which is smaller than the first diameter, wherein
   e. the fastening portion comprises along the longitudinal axis in the direction of the connecting portion a second conically widening transition portion adjacent to the first locking portion, an adjoining second cylindrical head portion with a third diameter which is larger than the first diameter, a third conically tapering transition portion and a second locking portion having a fourth diameter corresponding to the second diameter.

2. The coupling bolt according to claim 1, wherein the first and/or the second locking portion is/are configured cylindrically.

3. The coupling bolt according to claim 1, the pre-fixation portion of which has an inserting portion adjacent to the first cylindrical head portion and facing away from the connecting portion.

4. The coupling bolt according to claim 3, the inserting portion of which has the shape of a spherical section or a spherical disc.

5. The coupling bolt according to claim 1, having at least one of the following features:
   a) a fourth conically widening transition portion and/or
   b) a shaft portion
   adjoining the second locking portion of the fastening portion.

6. The coupling bolt according to claim 1, having at least one of the following features:
   a) a step provided between shaft and connecting portion and
   b) the connecting portion being configured with two steps.

7. The coupling bolt according to claim 1, with the coupling bolt being made of a plastic material or of a metallic material.

8. A first component, in or to which the coupling bolt according to claim 1 is fastened.

9. The first component according to claim 8, into which the connecting portion of the coupling bolt is at least partly molded or embedded.

10. A plug-in coupling comprising the coupling bolt according to claim 1 as well as a coupling seat.

11. The plug-in coupling according to claim 10, wherein the coupling seat is configured as one part, is lockable in an installation opening of a second component, wherein the installation opening has the shape of an elongated hole, and wherein the coupling seat provides a receiving space in which the coupling bolt is releasably lockable in a pre-fixation position and a fastening position and is linearly movable in the receiving space in a locked state.

12. The plug-in coupling according to claim 11, wherein the coupling seat furthermore comprises the following features:
   a. a closed circumferential wall of a dome shaped vault encompasses the receiving space for the coupling bolt, wherein the vault includes an outer locking structure for fastening the coupling seat in the installation opening of the second component, an open end with plug-in opening having the shape of an elongated hole for a plugging-in of the coupling bolt in a plug-in direction and a closed end with an adjacent inner locking structure for the coupling bolt,
   b. an opening cross-section having the shape of an elongated hole of the plug-in opening as well as an inner vault cross section having the shape of an elongated hole of the receiving space each perpendicular to the plug-in direction are defined by a longitudinal axis and a shorter transverse axis extending transversely to the longitudinal axis, and
   c. at an inner wall of the receiving space, the inner locking structure of the dome shaped vault includes two inner locking webs being arranged opposite to each other, which extend parallel to the longitudinal axis of the inner vault cross section and form an undercut opposite to the inserting direction, wherein
   d. the inner locking structure does not include any locking webs parallel to the transverse axis of the inner vault cross-section and allows a movement of a locked coupling bolt along the inner locking webs in the receiving space transverse to the plug-in direction.

13. A connecting structure including a first component, a second component as well as the plug-in coupling according to claim 10, with the coupling bolt being fastened in or at the first component and the coupling seat being fastened in or at the second component and the coupling bolt being locked in the coupling seat.

* * * * *